May 17, 1932.  J. A. KELLERMANN  1,859,040

METAL SMOKE STICK FOR FRANKFURTS

Filed April 5, 1928

Witnesses:
N. G. Barrett
W. A. Snow

Inventor
J. A. Kellermann
By Rummler & Rummler
Atty.

Patented May 17, 1932

1,859,040

UNITED STATES PATENT OFFICE

JOHAN AUGUST KELLERMANN, OF CHICAGO, ILLINOIS, ASSIGNOR, BY MESNE ASSIGNMENTS, TO INDUSTRIAL PATENTS CORPORATION, OF CHICAGO, ILLINOIS, A CORPORATION OF DELAWARE

METAL SMOKE STICK FOR FRANKFURTS

Application filed April 5, 1928. Serial No. 267,593.

This invention relates to a means for supporting links of sausage such as Frankfurts, during the smoking, coloring and curing operation.

The purpose of the invention is to provide an improved smoke stick or hanger for sausage links which supports the sausage at the twisted part between the links in such manner as to obviate pale and raw marks on the sausage, as is the case where it has rested against the wooden sticks generally used. It is also an object of the invention to provide in a device of this class supports rigidly connected and spaced apart a distance equal to the length of a sausage link and thus avoid irregularity in the product. A further object is to provide an improved method of supporting link sausage during the smoking operation.

The objects of the invention are accomplished by a construction as shown in the drawings wherein, Figure 1 is a plan view of the improved smoke stick.

The improved smoke stick as illustrated, comprises a pair of rods 1, held spaced apart the length of a sausage link, the end angle bars or rack rests 2, and the central tie rod 3. The rods 1 are welded to the bars 2 and to the rod 3. The angle bars 2 extend laterally from the rods 1 the required distance to insure correct spacing of the smoke sticks when at rest on the smoke house racks.

Figure 1:
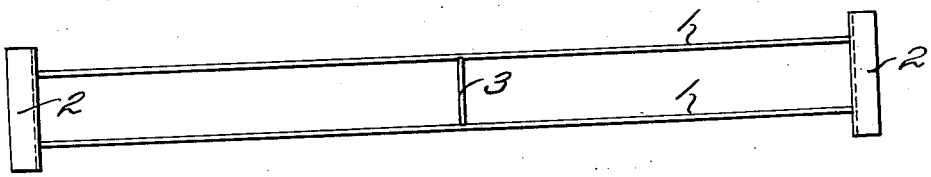
Figure 2:
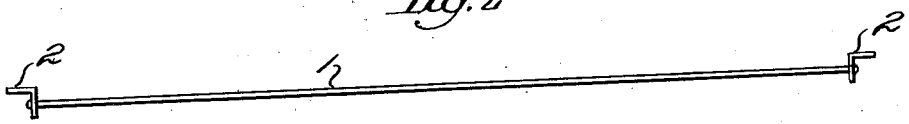
Fig. 2 is a side view.
Figure 3:
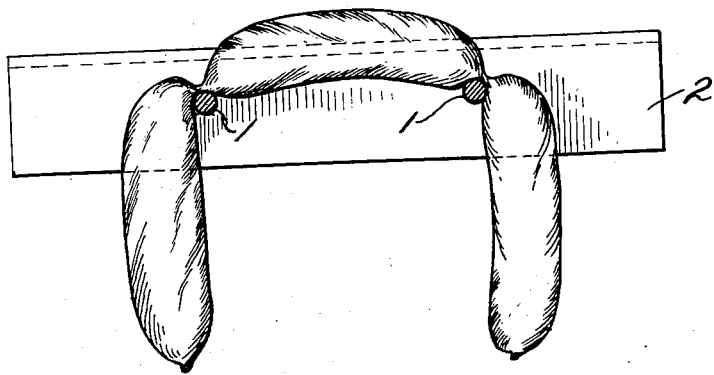
Fig. 3 is an enlarged transverse sectional view showing sausage links suspended therefrom.
Figure 4:
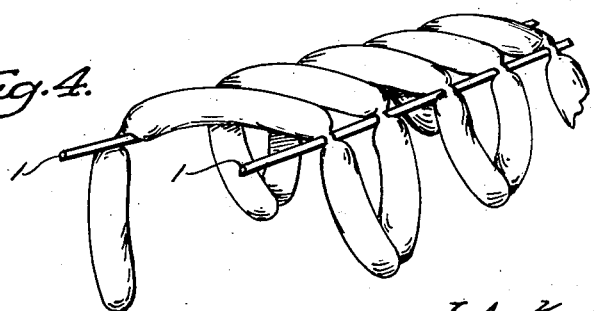
Fig. 4 is a fragmentary perspective view illustrating the preferred method of hanging link sausage on the smoke stick.

In the use of the construction described, the sausage links are placed thereon as illustrated in Figs. 3 and 4. The supporting rods 1 fit between the links at the twisted part of the casing which is one-fourth to three-eighths of an inch long or approximately the diameter of rods 1. The links are therefore not flattened out or dented and pale in color at this point as results from the use of the old form of single wooden sticks. The prior wooden sticks for strength are generally about 1" x 1⅛" in cross section and therefore sausage links hung thereon are unavoidably affected in form and color.

The horizontally supported links as shown in Figs. 3 and 4 have their concave sides down and retain a better shape and appearance than is the case when the convex sides are down. The Frankfurts are hung in strings of three each as shown in Fig. 3 or in longer strings as shown in Fig. 4 where some of the links are suspended in loops over the rods 1 and from the ends of the horizontal links.

I claim:

1. A smoke stick comprising a pair of metallic rods disposed to lie in the same horizontal plane and spaced apart a distance to engage the twists of the casing at the ends of a link of a string of sausages, plates welded to the ends of the rods and formed with outwardly disposed rack engaging flanges, and a metal tie rod between and in the plane of the rods and welded thereto to prevent inward or outward displacement thereof.

2. A smoke stick comprising a pair of metallic rods disposed to lie in the same horizontal plane and spaced apart a distance to engage the twists of the casing at the ends of a link of a string of sausages, plates welded to the ends of the rods and formed with outwardly disposed rack engaging flanges, and having opposite ends extended to form spacing means for properly separating a plurality of sticks when racked, and a metal tie rod welded to the pair of rods intermediate their ends to maintain them in predetermined position.

3. A new article of manufacture, a smoke stick of homogeneous structure and comprising a pair of metallic rods adapted to support a frankfurter horizontally therebetween, elongated strips of metal welded to the ends of the rods and having end extensions to form spacing means, and having their upper portions bent laterally to provide outwardly disposed flanges, and a metal tie rod between and in the plane of the rods and welded thereto to prevent inward or outward displacement thereof.

4. A smoke stick for supporting sausage links comprising a pair of parallel thin metallic bars positioned in a horizontal plane and spaced apart the length of a sausage link to receive the corresponding necks of tissue respectively, which connect a medial link laid horizontally between said bars to the next adjacent links, and rigid cross connecting means mutually spaced appropriately to positively maintain said bars constantly in their stated relation.

5. A sausage support for smoke-house use comprising a pair of rigidly connected bars of minimum size consistent with adequate strength for customary loads, said bars being spaced according to the standard length of sausages, to receive the tissue part which connects adjacent end-connected sausages when said support is disposed horizontally for use.

Signed at Chicago this 26th day of March, 1928.

JOHAN AUGUST KELLERMANN.